Dec. 8, 1964   G. L. RAMBO   3,160,869
OVERSPEED EVENT INDICATOR

Filed July 31, 1961   3 Sheets-Sheet 1

INVENTOR.
GEORGE LELAND RAMBO
BY
Attorney

Dec. 8, 1964  G. L. RAMBO  3,160,869
OVERSPEED EVENT INDICATOR

Filed July 31, 1961  3 Sheets-Sheet 2

INVENTOR.
GEORGE LELAND RAMBO
BY
Bruno Le Chle
Attorney

Dec. 8, 1964 G. L. RAMBO 3,160,869
OVERSPEED EVENT INDICATOR
Filed July 31, 1961 3 Sheets-Sheet 3

*INVENTOR.*
GEORGE LELAND RAMBO
BY
Attorney 3,160,869
OVERSPEED EVENT INDICATOR
George Leland Rambo, Moline, Ill.
(523 12th St., Baraboo, Wis.)
Filed July 31, 1961, Ser. No. 127,975
6 Claims. (Cl. 340—263)

The invention provides a novel means for enforcing a motor vehicle speed limit without depending on the presence of a policing officer at the time and place where the speed limit is exceeded.

The invention for the first time places the onus of reporting a speed violation upon the driver of the vehicle himself.

The invention consists of a device, carried by the vehicle, that is set in operation when a set speed limit has been exceeded. Once set in operation, the device runs for a fixed time interval, such as 24 hours. The operator cannot set the device.

Thus, an inspection of the device will show either:

That the device has not been set in operation, hence the speed limit has not been exceeded.

That the device is still operating, indicating that the speed limit has been exceeded at least once in the last 24 hours.

That the device has been in operation but has come to a stop at the end of the 24 hour period. This indicates that the speed limit has been exceeded, at least once, more than 24 hours ago.

Thus, the operator of a fleet of vehicles can instruct his drivers to report at the end of each day if they have exceeded the speed limit. If the devices are periodically inspected, they will indicate which drivers have not exceeded the speed limit, which have done so and reported, and which have ignored instructions to report. The latter can be censured, penalized, or dismissed.

Similarly, the renter of vehicles can determine which of his clients are good risks, and which are not because they ignore speed limits and invite damage claims against the car renting agency.

Schools often face the problem where they wish to deny students the privilege of having cars because students get into trouble, but students living off campus, or working, require transportation. This device permits granting every student the privilege of using his car until there is proof that he has misused that privilege.

It is not necessary for the fleet operator or the renting agency to inspect the device daily; a periodic unannounced check is sufficient and will accomplish the same results that would be accomplished by a myriad of speed censuring agents in the field.

The ability of the device to grant a period of grace— say 24 hours—is an essential feature of the invention. The driver that reports before the period of grace has expired is cooperative; the driver that has not reported the incident and is found with the device showing the speed has been exceeded and with the period of grace expired is obviously not cooperative and censure, dismissal, or fine are justified.

Of course it is obvious that the grace measuring device must be of a type that cannot be reset by the driver before he reports the violation. The person or officer to whom the report is made alone can provide the means for resetting the period of grace.

The invention is not limited to any particular timing device, mechanical, electrical, or chemical, that determines the period of grace. In a preferred form of the invention, a replaceable cartridge is used which deteriorates under the action of the current from the car battery within the period of grace that starts when a triggering device responsive to the vehicle speed, when the allowable speed is exceeded, closes the electrical circuit. This cartridge is somewhat similar to a fuse in general appearance with a metallic cap at each end of a glass tube. Thus the cartridge may be a glass tube with metallic caps at each end, generally similar to a fuse. A new cartridge can only be obtained from the person or officer to whom a report must be made.

It should be noted that the invention has an advantage over other devices that attempt to prevent violation of speed limits by using a speed governor to prevent a set speed from being exceeded in that it leaves it to the driver to determine under any given condition whether his safety requires that he exceed the speed limit or not. Thus he may avoid a collision or save a life.

The invention, as thus far described, serves to discourage violations of one speed limit which is normally that set for the open highway. It still leaves the enforcement of lower speed limits within towns, school districts, or the like, to the local traffic enforcement officials.

One form of the invention enables the speed governor to respond to any one of several speed limits. In this form of the invention the period of grace determining device will be set in operation by one speed on the highway and by another speed within a limited speed zone. The shift making the device responsive to one speed or another may be initiated by radio waves transmitted in the restricted speed area and picked up by an antenna on the vehicle. Thus in driving down the highway and passing through a town, the device is only triggered if some speed, such as 60 miles an hour is exceeded until the vehicle enters the town. Then the device is triggered by a speed in excess of some other limit, such as 30 miles per hour. Then as the vehicle leaves town, the device will again respond to speeds in excess of 60 miles per hour.

The invention will be illustrated by a description of that form of grace measuring device that uses a cartridge that deteriorates under the influence of a current coming from the vehicle battery.

The cartridge is a subminiature lapsed time indicator. It may be used to indicate the total number of hours that have passed since the time a D.C. voltage was applied across the terminal ends. These cartridges may be obtained in various time ranges. One such cartridge is marketed by the Bergen Laboratories and is called a chronister. The chronister is in effect a miniature electroplating bath containing an anode, cathode and electrolyte. When a D.C. current passes through the electrolyte, metal ions are carried from the anode to the cathode. Since the current flow is constant the length of both the cathode and anode will change with lapsed time (the anode becoming shorter and the cathode becoming longer). A time scale alongside the anode can then be calibrated directly in hours. This scale may be viewed through the window No. 20 in FIGURE 4.

The object of the invention is to provide a device that records the infraction of the speed limit applying to the particular zone through which a vehicle is passing.

Another object of the invention is to provide an incentive for a driver that has exceeded a set speed limit to report that fact within a set time.

Another object of the invention is to distinguish the drivers that exceed speed limits only rarely from those that habitually violate speed limits in the absence of a supervising speed detector personnel or equipment.

Another object of the invention is to provide a device which will indicate whether the allowed speed has been exceeded by a vehicle within a set period before inspection of the device.

Figure 1:
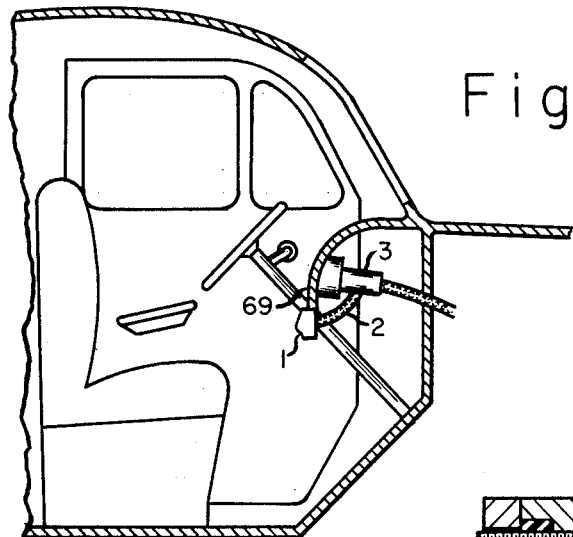
FIGURE 1 is a vertical section of the chassis of a motor vehicle in which the invention is mounted.
Figure 2:
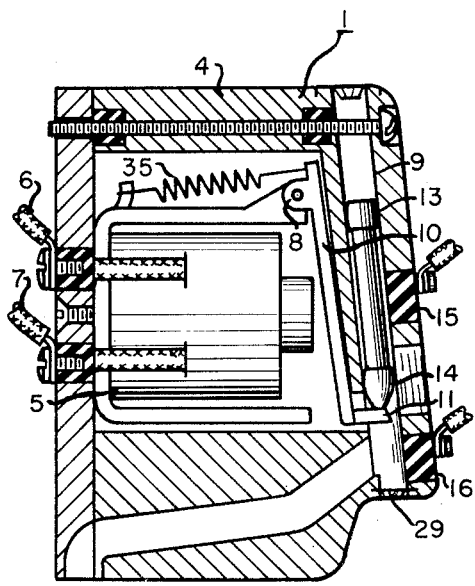
FIGURE 2 shows, in section, the elapsed time indicating unit, when the vehicle is moving within the allowable speed range.

In FIGURE 1, one form of the invention is shown installed in the chassis of an automobile shown in vertical section. The speed monitoring device 1, is preferably a housing made of non-metallic material 4, and is attached to the dash 69, of the body. Attached to the speedometer cable is a speed responsive governor 3. The governor may be of the type described in Patent 2,628,345, Vehicle Warning Device, granted George B. Todd, and closes a set of contacts not shown, when the maximum allowable speed is exceeded by the vehicle. A cable 2 carries wires connecting these contacts to terminals 6 and 7 in the monitoring device 1 and current is supplied through one of these wires to solenoid 5 when the set of contacts in governor 3 close. The other wire leads to the ground. In the device 1 an armature 10 is pivoted at 8. The tension spring 35, attached to one end of the armature biases the armature to the position shown in FIGURE 2. In that position the projection 11 of the armature extends into a passage 9 extending in a substantially vertical direction through the housing. A cartridge 12 more fully described below is inserted in the top 24 of passage 9 through a one way expendable spring opening and its end 14, made of conducting material, rests on projection 11. The other end 13 of the cartridge, somewhat larger in diameter than end 14, is also made of conducting material. However, in the position of the cartridge shown in FIGURE 2, neither end of the cartridge is in contact with a source of power. This cartridge may be of the type marketed by the Bergen Laboratories and deteriorates at a fixed rate when the two conducting ends of the cartridge place the cartridge in a live electric circuit. However, in the position shown the cartridge, not being in the circuit, will not deteriorate.

When the top allowable speed is exceeded by the vehicle the contacts in governor 3 close, current flows thru the cable 2 and terminals 6 and 7 of the solenoid 5. The solenoid now attracts armature 10, drawing the projection 11 out of passage 9. The cartridge now falls from the position shown in FIGURE 2 to the position shown in FIGURE 3.

Figure 3:
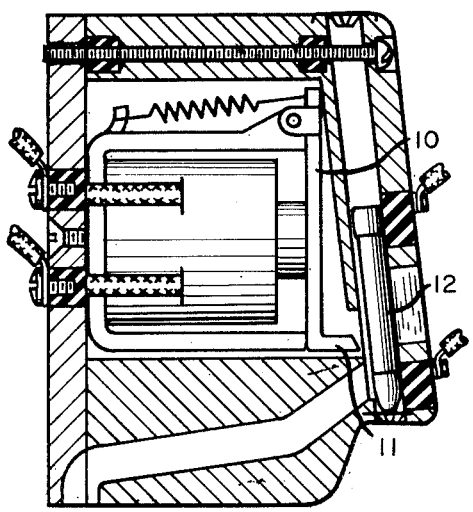
FIGURE 3 shows the same unit, in section, while the vehicle is exceeding the allowable speed.
Figure 9:
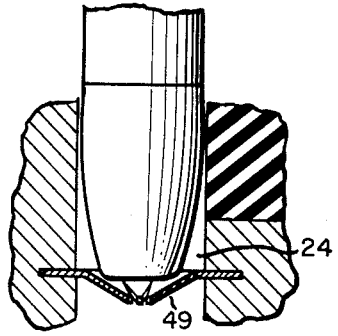
FIGURE 9 shows, in section, to an enlarged scale the flexible disc supporting a cartridge from the lower end of passage 9.

Spring fingers 49, see FIGURE 9, capable of being pushed back only when the cartridge is forced down, support the cartridge in the position shown in FIGURE 3.

Figures 4, 5:
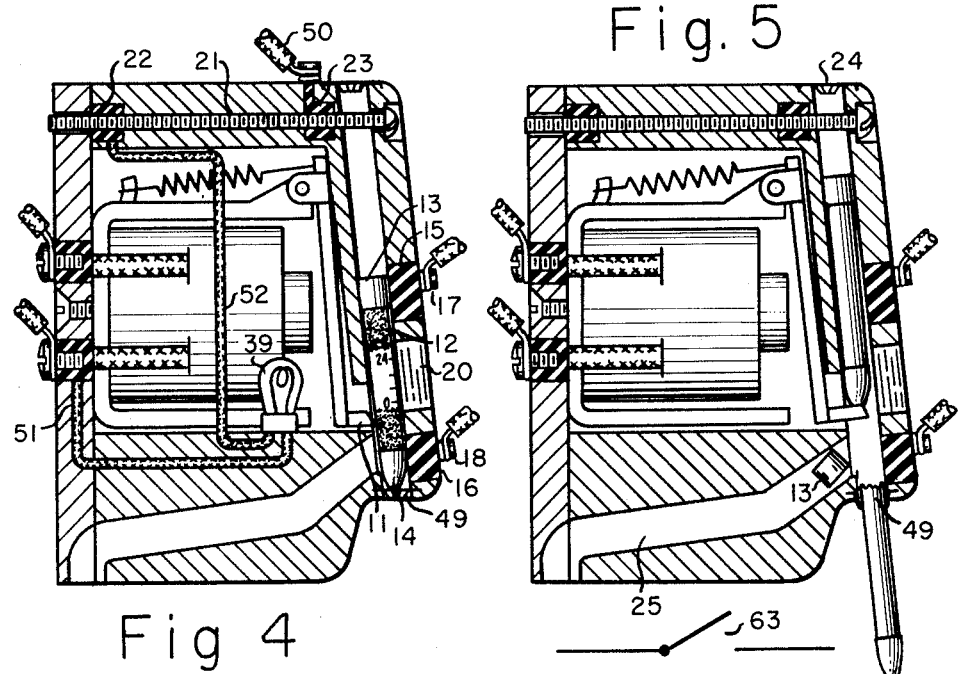
FIGURE 4 shows the same unit, in section, when the vehicle has dropped back to the allowable speed.
FIGURE 5 shows the ejection of a spent cartridge from the same unit by the insertion of a new cartridge.

When the vehicle speed drops back to the safe range, current ceases to flow thru the solenoid 5, the spring 35 tries to return the armature to its initial position and projection 11 bears against the cartridge as shown in FIGURE 4. This pushes the metallic ends of the cartridge 12 against terminal pads 15 and 16 in passage 9. Terminals 17 and 18 are respectively connected to the positive and negative side of the car battery and thus supply the current which causes the cartridge to deteriorate. The housing has a window 20 through which the condition of the cartridge can be observed.

Figure 10:
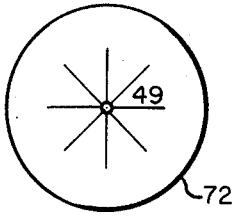
FIGURE 10 shows the flexible disc in plan view.
Figure 11:
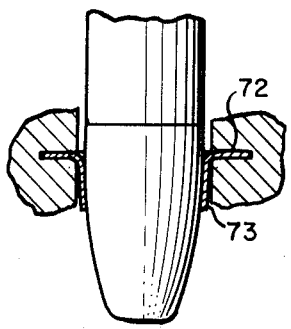
FIGURE 11 shows the flexible disc distorted to permit the ejection of the cartridge from the lower end of passage 9.

The one way passage insert 72, see FIGURE 10, allows the cartridge to be inserted and removed but prevents the cartridge from being removed without being broken. This prevents a person from removing the cartridge and reinserting it to prevent it from timing out. The metallic spring type insert shown in FIGURE 11 is molded into the speed monitoring housing so as to restrict the opening at each end of the cartridge tunnel 9 and allow for a one way passage of the cartridge through the tunnel. The insert 72 is circular and has split sections extending from the center of the piece. The split sections or fingers 49 are formed in a cone shape in conformance to the direction of the passage. When a new cartridge is inserted into passage 9, sections 49 open up as shown in FIGURE 11. This allows the cartridge to be inserted. When the device has been triggered and the cartridge has dropped to the timing position it may be removed by inserting a new cartridge and using it to push the expended cartridge out through passage 29.

The end 14 of the cartridge is of a smaller diameter than the end 13 and the passage 29 which is an extension of passage 9 is made large enough to pass the cartridge and the end 14 but not the end 13. This end is therefore stripped off as the cartridge leaves the housing 1 and the stripped end 13 may pass out through a passage 25.

One of the main purposes for destroying the cartridge is to make sure that it cannot be reused. If this was not the case, a driver could exceed the speed limit, stop and remove the cartridge that had been tripped by inserting another one which would remain in the untripped position until the speed was again exceeded. However, if it is destroyed when it is removed it could not be extracted to stop the timing of the grace period and then reused.

If the device is to function as a monitoring device it is essential that the driver of the vehicle cannot tamper with a cartridge that has been inserted, or partially insert it so that it will not respond to speeds in excess of the allowable maximum and then, when a traffic officer should approach to inspect the vehicle, push it down into place which would give a false indication that the speed had not been exceeded.

Screw 21 passing across passage 9 prevents such tampering with the device. This screw must be inserted—and it cannot be inserted unless the cartridge is pushed into place.

Conceivably the vehicle driver might carry a spare cartridge and continue to drive with a cartridge that has long run down and expect to insert the good cartridge only when he is in imminent danger of apprehension. To prevent a rapid removal and replacement of screw 21, or leaving it out altogether, the screw is made long, fine threaded, and passes through two metallic nuts 22, 23 spaced far apart. The bulb 39, illuminating the cartridge so that it can be observed through the window, may be supplied with current from the car battery thru lines 50, 51. Line 50 connects with nut 23 and nut 22 is connected to line 52 that leads to one terminal of the bulb 39 while the other terminal of the bulb is connected to line 51 which may lead to the ground. Thus, the long screw 21 must be used and fully inserted to complete the circuit which allows the bulb 39 to light and failure of the bulb to light is an indication that the screw 21 in use either is not of full length or is not fully inserted. The operation of the invention, in the basic form described, is as follows:

Screw 21 having been removed, a cartridge 12 is inserted in passage 9, and screw 21 then replaced. Bulb 39 now lights up indicating that the device is in operation. The device is in the condition shown in FIGURE 2. The device stays in that condition indefinitely if the safe speed is not exceeded. When that speed is exceeded the speed responsive governor closes a circuit that actuates solenoid 5 and pulls the armature 10 into the position that allows the cartridge to move to a position where the ends of the cartridge are in contact with terminal pads 15, 16.

The same circuit that actuates solenoid 5 may also actuate buzzer or other warning device, not shown, to advise the operator that he did exceed the speed. When the car returns to normal speed the armature 10 takes the position shown in FIGURE 4 pushing the cartridge into contact with the terminal pads and assuring a continuing flow of current through the cartridge. The degree of deterioration of the cartridge can be observed thru window 20. If the driver reports at the end of the day—or even the next morning—both within 24 hour limit, to whoever is authorized to supply a new cartridge, the old cartridge will still be in the act of deterioration—showing cooperation on the part of the vehicle operator.

The new cartridge may then be inserted by the supplier of the new cartridge or it may be given to the vehicle operator to insert. It will take him some time to remove screw 21, to insert the new cartridge and push out the old cartridge and to replace screw 21. If he does not fully replace the screw or substitutes a shorter screw, bulb 30 will not light up, indicating that the device has not been placed in operation condition.

When the new cartridge is inserted, the old cartridge is pushed down thru the controlling spring and passage 9 which has a smaller diameter than the head of the cartridge. The head of the cartridge, unable to pass thru passage 29 is broken off and passes out thru passage 25. Thus the vehicle operator is prevented from reusing the old cartridge which still has an unused portion of its life remaining.

The form of the invention just described serves only to detect when one set speed is exceeded. That would naturally be the speed on the open highway.

In the form of the invention about to be described the apparatus will respond to different speeds at different times.

Figure 6:
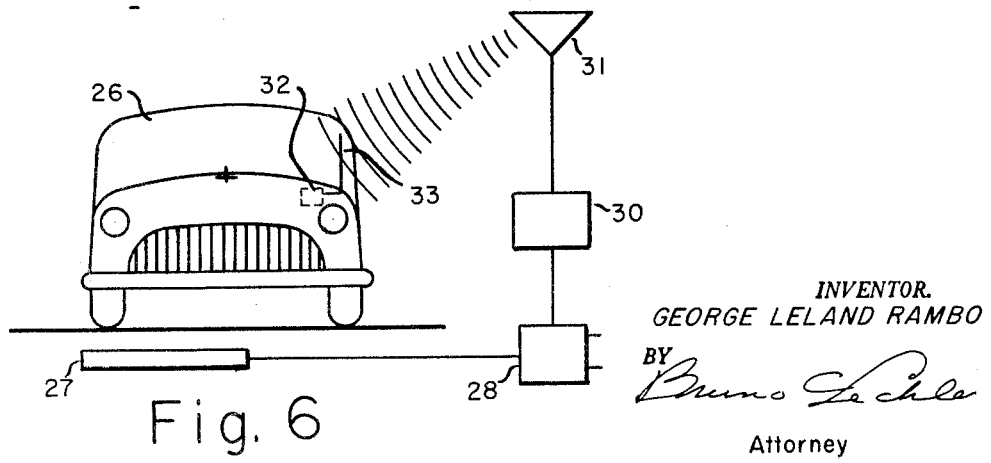
FIGURE 6 shows a vehicle equipped with a modified form of the invention that is responsive to various speeds, each appropriate for a particular area.

Thus the invention will respond to one speed on the open highway and to a lower speed in a congested area. The modified form of the invention is shown in FIGURE 6.

In this form of the invention the speed responsive governor closes one set of contacts at a low speed and another set of contacts at a high speed limit. The low speed limit contacts are in a circuit normally open.

To place current on this circuit so as to make the low speed contacts effective a signal from a device in the low speed area must be received by the vehicle. The figure 6 shows a radio wave emitter, normally not sending out waves, that will send out waves only when a motor vehicle is passing a given location.

Figure 7:
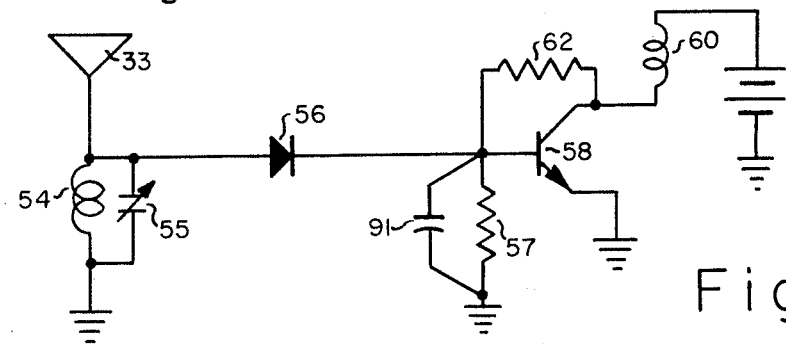
FIGURE 7 shows an electrical circuit in the modified form of the invention.

When a vehicle 26 travels down a street it sets up a magnetic disturbance in the space immediately around the vehicle. This disturbance can be detected by an electric detector 27, such as is used to actuate traffic signals. Other methods may be employed for detecting the vehicle such as pressure pads in the roadway, electric eyes, etc. The electric pulse which is generated passes through a set of wires to amplifier 28. The amplifier builds up the pulse. The amplifier pulse now travels to the radio transmitter 30. A delay relay in the transmitter, not shown, will be closed which will allow the transmitter 30, to send out a timed signal over antenna 31 as long as the automobile is near detector 27. The signal will conform to wave lengths assigned for traffic used by the F.C.C. The area covered by this signal may be limited to small areas. Several transmitters may be placed throughout a zoned area such as a city. The transmitters could be of the portable type so that they could be moved about. They could be operated by time clocks so they could operate only during certain hours. The passing vehicle will pick up the signal on its antenna 33 and the radio frequency pulse will close a set of contacts in the radio receiver 32. This radio receiver has a circuit such as shown in FIGURE 7. When the contacts in radio receiver 32 are closed, a current is allowed to flow thru a circuit which includes the low speed contacts in the governor 3, FIGURE 1. If the low speed is being exceeded and these contacts are closed, the speed monitoring device will be tripped.

FIGURE 7 shows a circuit of a very small radio receiver that could be sealed and placed under the hood of an automobile. Since no vacuum tubes would be used, the receiver would be nearly service free for the life of the automobile. The receiver would be turned on all the time the automobile ignition key was turned on but there would be negligible current drain on the battery unless the receiver detected a signal. The current drain then would be slight. Antenna 33 may be the regular antenna on an automobile. It may be used direct or a tap run from it. It picks up the signal sent out by transmitter 30, FIGURE 6. The signal that is desired is separated from those of all other stations by a resonant circuit consisting of a tuning condenser 55 and an R.-F. coil 54. The R.-F. coil and tuning condenser are tuned to a parallel resonance to enable them to develop maximum pick-up voltage. The selected modulated signal passes through diode 56. The diode converts the modulated radio frequency wave into a half wave modulation voltage. The modulation voltage will appear across resistor 57. Condenser 91 is in the circuit to remove the A.C. carrier signal. The voltage appearing across resistor 57 increases the current flow from the emitter through the base of a transistor 58. This causes a large current to flow from the ground through the emitter to the collector and through relay coil 60. This will cause relay contacts 61 to close and complete the circuit from the battery to the low speed contact in the governor 3. The 62 resistor is used to furnish an operation bias level as well as a D.C. feedback so that the parameters of transistor 58 are not critical. In this way the circuit would not be confined to any one type of transistor. A NPN transistor is illustrated, however a PNP can be used if the battery potential is reversed as it is in some makes of automobiles. Although many types of receivers may be used I have described a small, compact, inexpensive transistor receiver because it requires no special power supply and can be operated directly from the automobile battery.

Figure 8:
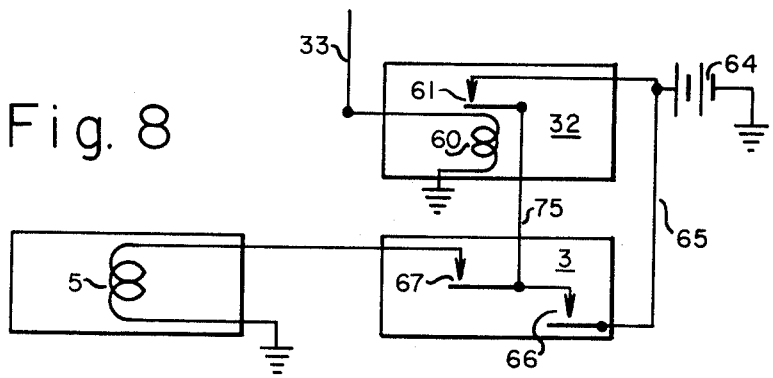
FIGURE 8 shows circuits selectively closed at various speeds to make the invention responsive to various speed limits.

FIGURE 8 is a block diagram which shows in detail the operation of the governor 3 in a device responsive to either of two speeds. Contact 67 closes when the speed is exceeded in the slower speed zone such as in a city or school zone. Contacts 66 close when the higher speed limit is exceeded.

*Example.*—The state speed limit is 65 m.p.h. and city speed limit is 30 m.p.h. When the motorist passes 30 m.p.h. contact 67 closes and when he exceeds 65 m.p.h. contact 66 closes completing a circuit through governor 3. When the top speed is exceeded a current from 64 will flow through line 65 through contacts 66 and 67 to solenoid 5 in the speed monitoring device. This trips the device and the grace time would now be in effect. However, if the lower speed is exceeded in a lower speed zone and a transmitter is actuated, the signal picked up by antenna 33 furnishes the current to energize coil 60 of the relay in the radio. Now current from battery 64 may pass through contact 61 in radio 32 and continue through line 75 and the closed contact 67 in governor 3 and to solenoid 5 in the speed monitoring device which will also trip the device so the grace period is in effect. It will also be noted the open contact 66 has been by-passed.

In the modified form of the invention just described the monitoring speed is changed only while the automobile is within the range of a signal emitter. In another modified form of the invention the monitoring speed is changed by a radio transmitter as a congested area is entered and remains changed until that automobile leaves the congested area and passes near another radio wave emitter. Thus a vehicle travelling from Pittsburgh to Boston might be travelling with the monitoring device responsive to 60 miles per hour until it reaches the New York city suburbs in New Jersey then travel with the monitoring device responsive to 30 miles per hour thru the balance of New Jersey, thru the city and its suburbs, and continue into Connecticut and then, on leaving the last suburb—perhaps 40 miles from the point where the monitoring speed was changed—revert to the 60 mile per hour setting.

Figure 12:
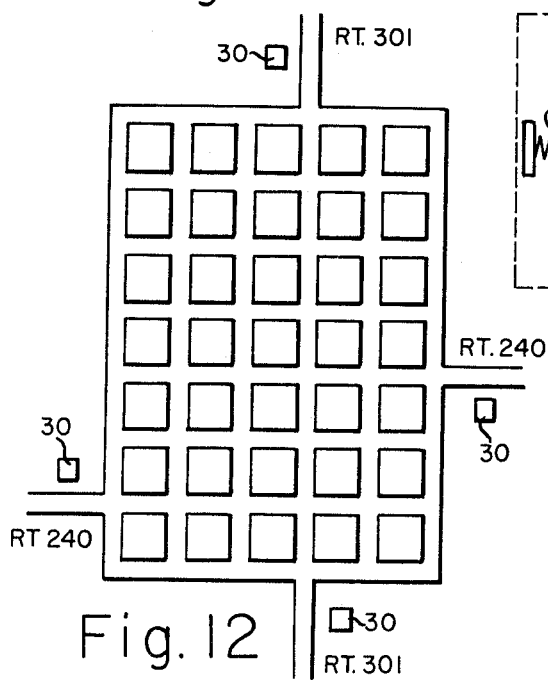
FIGURE 12 shows in plan a low speed civic area and the location of the radio transmitters placed at the point where thru roads enter the area to actuate another form of the invention.
Figure 13:
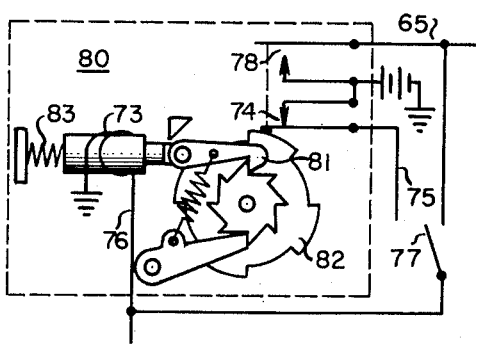
FIGURE 13 shows a stepping device actuated when a vehicle enters or leaves a low speed area used in the form of the invention shown in FIGURE 12.

In this form of the invention shown in FIGURES 12 and 13 the relay 60 in the radio receiver, FIGURE 7, may be replaced with a sequence relay 80 as shown in FIGURE 13. The relay is shown being energized as the vehicle enters the restricted speed area. The contacts 74 are now closed so battery current will flow through contacts 74 through line 75 to contacts 67 in FIGURE 8 controlled by governor 3. This will supply the necessary current to close solenoid 5 tripping the cartridge into timing position. When the vehicle leaves the city on route 301 in FIGURE 12 it will pass another transmitter station 30 which will be detected by the radio as described in FIGURE 7, relay 80, FIGURE 13, being used in this form of the invention to replace relay coil 60. When the relay coil 73 is energized pawl 81 is retracted. This in turn advances sequence cam 82 one notch and allows contacts 74 to open. When the vehicle has passed the transmitter, current is removed from coil 73 and the spring 83 returns pawl 81 to engage the next ratchet tooth for the next operation. The 66 contact in FIGURE 8 will not be passed now so the unit will not be triggered until the higher speed is exceeded. There are many types of this relay on the market. When the vehicle enters the city again on any of the routes shown in FIGURE 12 the sequence relay will again be advanced closing contact 74 thus placing the lower speed in effect. It will be noted that when contacts 74 are closed contacts 78 are open and when contacts 74 open contacts 78 are closed. Contact 78 is in series with switch 77 and when the contact and the switch are closed it completes a circuit from the battery to coil 73. When contacts 74 are open the higher speed is in effect. In this form of the invention provisions must be made to correct the position of the stepping relay should it get out of step. This might happen if the battery of the vehicle went dead and the vehicle was towed past a transmitter station 30, FIGURE 12. When the vehicle was back in service, we might then get the condition that in entering a high speed zone the stepping relay would make the device responsive to low speed only and when entering a low speed zone responsive to high speed. The extra set of contacts 78 on the sequence relay are connected in series with a switch 77. The sequence relay may be stepped to the slower speed by closing the switch 77. This allows battery current to flow through contacts 78 to line 65, switch 77, line 76 and relay coil 73. This will advance the relay to the slower speed responsive position.

Due to the contacts 78 being open when the vehicle is in the slower speed zone, it is impossible to flip the switch 77 and advance the sequence relay so it will operate on the higher speed range while in an restricted area. A dash light, not shown, may be wired in parallel with contact 74 to indicate to the driver what speed range the speedometer is set for. If the light is on, the "restricted area" speed is in effect, then the light will not show if the higher limit is in effect.

I claim:
1. A system for determining whether a given vehicle has exceeded the set speed applicable to any one of several areas in which the vehicle has moved during a period of set length prior to inspection of the vehicle, comprising, a vehicle speed responsive apparatus in each vehicle, circuits responsive to each of several speeds closed by said apparatus, means at the entrance of each area covered by the system to select a particular one of said circuits in each vehicle, a time interval measuring apparatus normally in one condition set in operation by the selected circuit when the allowable speed in that area is exceeded and means to maintain said time measuring apparatus in its operating condition until the time interval has elapsed.

2. In a vehicle speed monitoring device, comprising a housing, a speed responsive device, an electric circuit closed by the speed responsive device when a set speed is exceeded, a passage in said housing, a cartridge in said passage having external contacts and capable of deteriorating at a set rate when current is supplied, means actuated when said circuit is closed that permit said cartridge to move from its normal position to a new position where contacts in the wall of the passage engage the contacts on the cartridge, an electrical circuit passing thru said contacts and said cartridge, a battery in said circuit providing a continuous supply of current.

3. In vehicle speed monitoring device, a housing, a vertical passage in said housing, a solenoid in said housing, an armature of said solenoid, a portion of said armature which in its unactuated position extends into said passage, a cartridge having external contacts and capable of deteriorating at a set rate when current is supplied located in said passage and supported by said armature, means to actuate said solenoid when a set speed is exceeded by a vehicle carrying the device to allow the cartridge to move down the passage to a new position, contacts in the wall of said passage which in the new position will engage the contacts of the cartridge, a battery supplying current to said contacts.

4. In a speed monitoring device of the type described in claim 3, means preventing tampering with a cartridge that has been inserted in the passage comprising a long fine threaded screw extending across the passage above the cartridge, a light in said housing, a circuit including said light closed only when the screw is fully seated.

5. In a speed monitoring device of the type described in claim 3, flexible fingers extending into the passage to support the cartridge when it has moved to a new position.

6. In a speed monitoring device of the type described in claim 3, a cartridge having an upper head projecting laterally beyond the cartridge, flexible fingers extending into the passage to support a cartridge in the new position, a passage below the fingers of smaller diameter than the upper head of the cartridge, a side passage above said flexible fingers thru which the head of the cartridge is ejected when the body of the broken cartridge passes the flexible fingers in ejection, thus assuring that the discharged cartridge is separated from its head and therefore cannot be reloaded and reused.

References Cited by the Examiner
UNITED STATES PATENTS

| | | | |
|---|---|---|---|
| 1,195,280 | 8/16 | Shipman | 340—264 |
| 1,443,040 | 1/23 | Rebori. | |
| 2,362,971 | 11/44 | Bosch | 340—53 |
| 2,640,979 | 6/53 | Carter | 340—53 X |
| 2,945,179 | 7/60 | Winn | 324—68 |
| 2,946,646 | 7/60 | Bower et al. | 324—68 |
| 3,042,136 | 7/62 | Havnen | 340—53 |

FOREIGN PATENTS 724,970    9/42    Germany.

NEIL C. READ, *Primary Examiner*.